Sept. 4, 1951  P. F. SANDERS  2,567,162
COATED ELECTRICAL CONDUCTOR
AND METHOD OF MAKING SAME
Filed Jan. 14, 1948
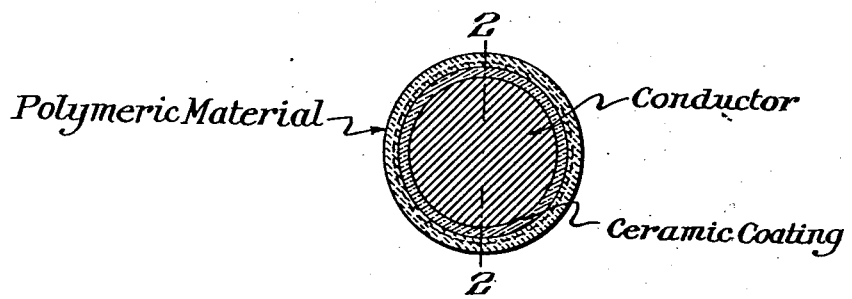
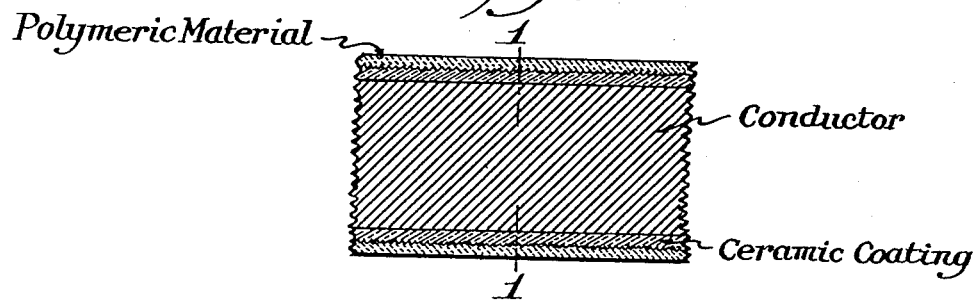
INVENTOR.
Philip Francis Sanders
BY A. Newton Huff
ATTORNEY Patented Sept. 4, 1951

2,567,162

UNITED STATES PATENT OFFICE 2,567,162

COATED ELECTRICAL CONDUCTOR AND METHOD OF MAKING SAME

Philip Francis Sanders, Lansdowne, Pa., assignor to E. I. du Pont de Nemours & Company, Wilmington, Del., a corporation of Delaware Application January 14, 1948, Serial No. 2,317

15 Claims. (Cl. 117—70)

This invention relates to new and improved insulation for electrical conductors, and, more particularly, to flexible, high temperature-resistant, insulation therefor.

This application is a continuation-in-part of Serial No. 783,269, filed October 31, 1947, and now abandoned.

In many uses of electrical conductors, extremely high temperatures are encountered which limit the type of insulation that can be employed for such uses. Refractory materials, such as glass, porcelain, and numerous ceramics, have been employed for high temperature-resistant electrical wire insulation, and, while these materials have excellent dielectric properties and are sufficiently resistant to high temperatures, they are very deficient in mechanical strength and are readily broken in ordinary usage, thus causing failure of the electrical equipment in which they are used.

In order to overcome the fragility of the ceramic electrical wire insulation, it has been proposed to coat the ceramic insulation with solutions or suspensions of certain organic film forming materials, such as shellac and various synthetic resins. Such surface coatings have had very little, if any, value in protecting the underlying ceramic coating from rupturing or breaking when subjected to bending or flexing. Further, the organic coatings employed heretofore decompose at the high temperatures encountered in many electrical uses and thereafter become as fragile as the ceramic coating alone.

It has also been proposed to combine organic film forming materials with a ceramic frit before application to an electrical conductor and then sinter the insulating material on the conductor. This method improves the initial flexibility of the insulation, but when subjected to high temperatures, the organic film former is decomposed and leaves the ceramic coating more porous and fragile than if no organic film former had been employed.

The dielectric properties of the recently available polytetrafluoroethylene, together with its high temperature resistance, flexibility, and tensile strength, make it a most outstanding electrical insulator for use where extremely high temperatures are encountered. However, it is not soluble in any known solvent and its use for electrical insulation has heretofore had to be limited to those applications where it could be used either in the form of a tape cut from a massive cake of the polymer or as the finely divided polymer. The polytetrafluoroethylene, in either of these forms, was placed in contact with the conductor and then heated under pressure to bring about its adhesion to the conductor, but this method is not adapted to small size conductors, such as magnet wire.

There have been no known methods for applying polytetrafluoroethylene to the wire in the form of a liquid coating composition, and the conventional wire coating apparatus has therefore been of no value for the making of insulated wire employing polytetrafluoroethylene. Furthermore, there has heretofore been no practical method for combining the good electrical insulation properties of ceramic wire coating with the flexibility and relatively high tensile strength of polytetrafluoroethylene. Applicant has found that the polytetrafluoroethylene may be applied, as disclosed hereinafter, in the form of a liquid coating composition depositing a continuous coating to obtain an electrical insulation having outstanding dielectric properties, resistance to high temperatures, and resistance to fracture when subjected to rough usage.

By the term "polymeric material," as used hereinafter, is meant polytetrafluoroethylene or copolymers of tetrafluoroethylene and one or more polymerizable organic compounds containing an ethylenic double bond, such as ethylene, vinyl chloride, vinylidene chloride, alkyl esters of acrylic acid, and alkyl esters of methacrylic acid.

The primary object of this invention is the provision of an electrical insulation which overcomes the disadvantages of the prior art materials while retaining their desirable properties. Another object is the provision of a new composite insulation which will withstand high temperatures and have high resistance to cracking or fracturing when subjected to a quick snap or bend. A further object is to provide a method for coating over a ceramic insulated wire to protect the ceramic insulation from cracking or fracturing when subjected to rough usage, such as bending, flexing, and impact. A still further object is the provision of a method of coating ceramic insulated wire with a liquid coating composition of polymeric material by means of a conventional wire coating apparatus. Other objects will become apparent as the description proceeds.

The objects of this invention are accomplished by applying over a ceramic coated conductor a liquid coating composition of polymeric material, and heating to coalesce the polymeric material.

In a modification of the invention, a suspension mixture of a ceramic material and polytetrafluoroethylene is first applied to the conductor, heated to coalesce, and cooled, after which the coating of polymeric material is applied as before.

In either case there is formed a strong, adherent, fracture-resistant, high temperature-resistant, corrosion resistant, flexible, continuous, outer sheath over the ceramic coated wire.

Referring to the drawings, Fig. 1 is a cross section, on the line 1—1 of Fig. 2, of the wire conductor produced in accordance with this invention. Fig. 2 is a longitudinal section, on the line 2—2 of Fig. 1, through the coated wire conductor, showing the polymeric material penetrating the pores and voids of the ceramic coating.

In carrying out this invention, the wire to be insulated is first coated with a ceramic material in any desired way, such as the methods disclosed in U. S. Patents 2,421,652, 2,393,068, 2,386,634 and 2,327,462. The ceramic materials which may be deposited on the conductor are extremely varied; e. g., they may comprise ceramic and/or vitreous materials. A few of the many materials falling within these categories are disclosed in U. S. Patent 2,386,634, page 3, column 1, lines 37 et seq. The ceramic materials are finely ground to small particle size suitable for suspension in a liquid medium. The suspension is accomplished with the aid of surface active agents and other assistants, such as organic binders.

As disclosed in the above mentioned patents, after the ceramic coating is deposited on the wire, it is then sintered to permanently attach the coating particles to the wire and to each other.

The ceramic coating, per se (i. e., where no polytetrafluoroethylene is present), and its method of application form no part of this invention.

The polymeric material is then preferably deposited over the ceramic coated wire in a plurality of coats from a suspensoid by means of any conventional wire coating apparatus. After each successive coat of suspensoid, the coated wire is passed through a heating zone to remove the volatile components of the coating composition and to coalesce the particles. The polytetrafluoroethylene particles are adhered to the ceramic coating and to each other when exposed to a temperature of approximately 750° to 780° F. for about 15 to 20 seconds when #28 copper wire (.0126" diameter) is employed.

It is preferred that the ceramic coated wire be passed through a bath consisting of a 2% aqueous solution of a wetting agent prior to each coat of polymeric material suspensoid. The wetting agent may be any aqueous surface active agent which is innocuous to the suspensoid.

The invention is further illustrated by the following example:

*Example 1*

A #28 soft copper wire, having a diameter of .0126 inch, was first coated electrophoretically with a porous ceramic coating of the type disclosed in U. S. Patent 2,386,634. It was then alternately passed four times, at a rate of 10.7 feet per minute, through a wetting bath, consisting of a 2% aqueous solution of the sodium salt of the sulfuric acid ester of a mixture of long chain alcohols (predominantly lauryl alcohol), and an aqueous suspensoid of polytetrafluoroethylene of the following composition:

|  | Parts by weight |
|---|---|
| 57.7% polytetrafluoroethylene aqueous suspensoid | 100.0 |
| Sodium salt of the sulfuric acid ester of a mixture of long chain alcohols (predominantly lauryl alcohol) | 0.87 |

After each successive coat of polytetrafluoroethylene, the wire was passed through a three foot long oven heated to approximately 750° F. After four coats of polytetrafluoroethylene were applied over the ceramic coating and thorough heating was applied after each coat, the diameter of the coated wire was .0148 inch.

The polytetrafluoroethylene, deposited on the ceramic coating in the form of a sheath, provided a completely waterproof coating, and prevented the ceramic coating from shattering and peeling when subjected to mechanical shock.

The polytetrafluoroethylene suspensoid of this example was prepared in accordance with the disclosure in copending application Serial No. 713,385, filed November 30, 1946, by Malcolm M. Renfrew; now Patent No. 2,534,058. The suspensoid was concentrated by the process of electrodecantation disclosed in copending application Serial No. 783,389, filed October 31, 1947, by C. K. Ikeda and now abandoned.

*Examples 2-5*

Four other pieces of #28 soft copper wire, having a diameter of .0126 inch, were coated in the manner described in Example 1, except the aqueous suspensoid of polytetrafluoroethylene had the following composition:

|  | Parts by weight |
|---|---|
| 59.4% polytetrafluoroethylene aqueous suspension | 98.25 |
| Sodium salt of the sulfuric acid ester of a mixture of long chain alcohols (predominantly lauryl alcohol) | 1.75 |

These four pieces of coated wire were marked Examples 2, 3, 4, and 5 and had 4, 3, 2, and 1 coats, respectively, of the above suspensoid.

The insulated wires of the five examples were then subjected to parallel tests, and the results were compared with those of a control comprising the same electrical wire conductor having the ceramic coating only. The results were as follows:

(Note.—The difference in film build between Examples 1 and 2 was the result of the higher solids content of the suspensoid of Example 2.)

|  | Control | Example 1 | Example 2 | Example 3 | Example 4 | Example 5 |
|---|---|---|---|---|---|---|
| Type Wire | #28 Copper | #28 Copper | #28 Copper | #28 Copper | #28 Copper | #28 Copper. |
| Type Insulation | Ceramic alone | Ceramic/Polytetrafluoroethylene. | Ceramic/Polytetrafluoroethylene. | Ceramic/Polytetrafluoroethylene. | Ceramic/Polytetrafluoroethylene. | Ceramic Polytetrafluoroethylene. |
| Dia. Wire | .0126″ | .0126″ | .0126″ | .0126″ | .0126″ | .0126″. |
| Dia. Wire+Ceramic | .0130″ | .0130″ | .0130″ | .0130″ | .0130″ | .0130″. |
| Dia. Wire+Ceramic+Polytetrafluoroethylene. | | .0148″ | .0155″ | .0149″ | .0142″ | .0136″. |
| No. Coats Polytetrafluoroethylene. | | 4 | 4 | 3 | 2 | 1. |
| *Dielectric Properties* | | | | | | |
| Dielectric Strength, Dry (V./mil.). | 150 | 1230 | 2360 | 1620 | 1280 | 430. |
| Dielectric Strength—After 24 hr. Water Immersion. | 100 | 960 | 1620 | 1450 | 1130 | |
| Insulation Resistance, Dry (megohms). | 0-52 | >25,000 | >25,000 | >25,000 | >25,000 | >25,000. |
| Insulation Resistance—After 24 hr. Water Immersion. | 0 | >25,000 | >25,000 | >25,000 | >25,000 | >25,000. |
| *Physical Properties* | | | | | | |
| Adhesion: | | | | | | |
|   Scrape, Dry (ozs.) | 1 | 31 | | | | |
|   Scrape, After 24 hr. Water Immersion. | 0 | 31 | | | | |
|   Scrape, Abrasion | 0 (20 g. wt.) | 196 (200 g. wt.) | 179 (200 g. wt.) | 158 (200 g. wt.) | 186 (200 g. wt.) | 60 (200 g. wt.). |
|   Quick Snap | NG [1] | Satisfactory | | | | |
|   Thumbnail Scrape | Skins easily | Skins difficultly | | | | |
| Flexibility: | | | | | | |
|   Kink | NG [1] | Satisfactory | | | | |
|   Quick Snap and Wound on Own Diameter. | NG [1] | do | Satisfactory | Satisfactory | | |
|   Twist | NG [1] | Perfect | | | | |
| Thermal Properties: | | | | | | |
|   Heat Loss (1,000 hr. @ 215° C.). | None | None | | | | |
|   Heat Shock (WOD, 30″ x 215° C.). | NG | Satisfactory | | | | |
|   Flexibility Retention @ 215° C. | NG | Satisfactory | | | | |
|   Cut-through Temperature. | 247° C.[2] | >500° C. (limit of test). | | | | |
| Miscellaneous: | | | | | | |
|   Toluene Extraction (g./1000′). | .29 | .41 | | | | |
|   Methyl Alcohol Extraction (g./1000′). | NG | .05 | | | | |
|   Continuity (Breaks/100′). | >200 [3] | 0 | | | | |

[1] Cracks, peels and/or chalks off.
[2] Probably caused by cracking.
[3] More than 15 breaks/100′ unsatisfactory.

The dielectric properties, i. e., dielectric strength and insulation resistance, were determined in accordance with A.S.T.M.-D149 and A.S.T.M.-D257, respectively, the test specimens comprising two pieces of insulated wire twisted under a tension of 12 ounces to have 16 twists over a distance of 4.75 inches.

The adhesion tests were carried out as follows:

*Scrape test.*—The insulated conductor (both wet and dry) was drawn over a smooth metal surface at right angles to and under a .010 inch diameter steel scraping wire which was mounted in such a manner that it could be weighted in varying amounts. The insulated wire was pulled under the weighted scraping wire and the load on the scraping wire was increased until the insulation was cut through which completed an electric circuit and lit an electric light bulb. The end point was indicated by the weight required to cut through the insulation.

*Scrape abrasion test.*—The scrape abrasion test was performed by an apparatus that repeatedly scraped the surface of the insulated conductor with a steel wire of .016 inch diameter at right angles to the length of the insulated conductor. A weight which forced the steel wire against the surface of the insulated conductor could be varied to cover a wide range of test conditions. The scrape-abrasion resistance was rated by the number cycles required for the steel wire to wear through the insulation.

*Quick snap test.*—The quick snap test was carried out by subjecting the insulated wire to a sudden elongation to the breaking point of the copper conductor. If, during the elongation and breaking of the copper conductor, the insulation coating (ceramic and polytetrafluoroethylene) pulled away from the conductor ("sleeving"), the adhesion was considered unsatisfactory. The magnitude of "sleeving" of the insulation was taken as an index of the degree of adhesion.

*Thumbnail scrape test.*—The thumbnail scrape test was conducted by merely scraping the insulation with the thumbnail. The degree of resistance of the insulation to pulling away from the copper conductor was taken as an index of the adhesion of the insulation to the copper conductor.

The flexibility tests were carried out as follows:

*Kink test.*—The insulated wire was doubled on itself and pulled to form a kink. The tension used was as close as possible to that used in the electrical industry for winding operations. The test specimen failed this test when cracks were observed in the insulation at the kinked portion.

*Quick snap and wound on own diameter test.*—The insulated wire was given a sudden elongation to the breaking point of the copper wire, which corresponded to approximately 30% elongation of the copper wire and polytetrafluoroethylene. The stretched portion was then wound around a mandrel having a diameter equal to that of the insulated wire before elongation. The winding tension was sufficient to provide a tight, even winding. Failure was encountered in this test when cracks were observed in the insulation after winding around the mandrel.

*Twist test.*—A four inch test specimen of insulated wire was clamped at one end and a torque was applied at the other end along the axis of the test specimen. A standard Scott twist tester was employed for this test. The end point of the test was considered to be the number of complete revolutions at which cracks appeared in the insulation. The insulation was considered to be perfect if the wire broke before the insulation cracked.

The tests for the thermal properties were carried out as follows:

*Heat loss test.*—Loosely wound coils of insulated wire of known weight were suspended in a 215° C. air oven. Loss of weight was determined at intervals by removing the samples and weighing them. The insulation was considered to be perfect and the test was discontinued if no weight loss occurred after 1000 hours under these conditions.

*Heat shock test.*—A length of insulated wire was wound around its own circumference with sufficient tension to form a tight, even winding. The wound sample was then placed in a 215° C. air oven for 30 minutes and then removed from the oven and allowed to cool to room temperature. The insulation was considered to have failed this test if cracks were present in the insulation after it had cooled to room temperature.

*Flexibility retention test.*—Loosely wound coils of insulated wire were suspended in a 215° C. air oven. At intervals, a portion of the sample was removed and allowed to cool to room temperature and then wound on its own circumference. A sample was considered to have failed this test if cracks developed in the insulation. Test results were recorded as hours under these conditions to reach failure. A sample was considered to be satisfactory if it had not failed in 1000 hours.

*Cut through temperature test.*—A length of insulated wire was twisted in the form of a loose overhand knot so as to have three cross-overs. This was placed on a smooth surfaced metal block with a 1000 gram weight placed over the loosely knotted section so that the 1000 gram weight was resting evenly on the three crossovers. The entire assembly was placed in a Wood's molten metal bath at 100° C. with the two ends of the insulated wire extending out of the molten metal. One end of the insulated conductor was connected to one terminal of an electric circuit and the other terminal was connected to the molten metal bath. The temperature of the molten metal was increased one degree per minute until the insulation was cut through to the copper wire by the 1000 gram weight, which closed the electric circuit and lit an electric light bulb. Failure was considered to be the temperature at which cut through to the conductor was encountered under the above conditions.

The miscellaneous tests were carried out as follows:

*Toluene and methanol extraction tests.*—A 10 foot length of the insulated wire was placed in suitable clean glass equipment and refluxed for 96 hours in approximately 100 cc. of the appropriate extraction solvent (redistilled C. P. toluene for one test and redistilled C. P. methanol for the other). The solvent was evaporated to dryness in a tared weighing dish in suitable equipment. The weighing dish was then heated 30 minutes at 115° C., cooled in a desiccator, and weighed to determine the amount of residue extracted. Results were expressed in grams of residue per 1000 linear feet of wire.

*Continuity test.*—The insulated wire was passed through a mercury bath at a maximum speed of 100 feet per minute with a continuous voltage applied between the mercury and the insulated wire. Whenever a break in the insulation passed through the mercury bath, the electric circuit was closed and the amount of current flowing through the circuit was recorded on a voltmeter. Results were expressed in the number of breaks per 100 feet of wire.

The preferred embodiment of the invention employs aqueous polytetrafluoroethylene suspensoid. However, a copolymer of tetrafluoroethylene and another polymerizable organic compound containing an ethylenic double bond, such as ethylene, vinyl chloride, vinylidene chloride, and alkyl esters of acrylic acid, may be used. These copolymers are described in copending application Serial No. 607,255, filed July 26, 1945, by Kenneth L. Berry, now Patent No. 2,484,483. The copolymer must be suspended in an organic medium, or employed as a solution in a hot organic solvent. Copolymers of tetrafluoroethylene and ethylene consist essentially of the reaction product of 50% to 85% tetrafluoroethylene and 50% to 15% ethylene, as disclosed in copending application Serial No. 607,256, filed July 26, 1945, by Kenneth L. Berry, now Patent No. 2,448,952.

A copper wire electrical conductor has been used in the above examples, and is preferred because of its high conductivity. However, it is to be understood that other conductors and semi-conductors, such as silver, aluminum, steel, nickel, nickel-chromium, beryllium-copper and iron-chromium, may be insulated in accordance with this invention. It should be especially noted that very thin wire, as low as .001 inch diameter, as well as much larger wires of all commercial sizes, may be insulated in accordance with this invention.

The baking temperature to bring about coalescence of the polymeric material particles deposited from the coating composition will vary with coating speed, length of oven, size and type of wire, and particular polymeric material used. The absolute minimum temperature at which fusion of polytetrafluoroethylene occurs is 621° F., and that at which fusion of the copolymer occurs is dependent upon the proportion and fusion point of the modifying material present in the copolymer, and will be somewhat less than 621° F. The maximum temperature for either type of polymeric material is that at which undesirable decomposition occurs (approximately 930° F., depending upon the above mentioned variables).

In the examples, the ceramic coating was first deposited over the copper wire electrophoretically at one location and shipped to another location for application of the polytetrafluoroethylene coating. A modification of this procedure is to pass the copper wire in one continuous operation through a cell to deposit the ceramic coating, sinter, cool, and then immediately pass the ceramic coated copper wire through the polytetrafluoroethylene suspensoid, heat and cool.

Since it is possible to pass an electric current through the aqueous polytetrafluoroethylene suspensoid containing the polar wetting agents, the polytetrafluoroethylene may also be deposited over the ceramic coating electrophoretically by means of an apparatus similar to that shown in Fig. 4 of U. S. Patent 2,421,652.

A modification of this invention involves coating a wire conductor with a suspension mixture of a ceramic material and polytetrafluoroethylene, heating to coalesce the particles, cooling, and then applying an outer coating thereover of the polymeric material defined herein, heating, and cooling to room temperature.

As indicated by the various examples, the outer sheath of polymeric material is very thin. In Example 5, the diameter of the insulated coated wire is only increased .0006 inch by the application of one coat of the polytetrafluoroethylene suspensoid. This corresponds to a radial thickness of only .0003 inch for the polytetrafluoroethylene, not allowing for the poylmer which penetrates the pores and voids of the ceramic coating. In Example 2, the diameter of the insulated coated wire is increased .0025 inch by the application of four coats of the polytetrafluoroethylene suspensoid, which corresponds to .00125 inch for the radial thickness of the polytetrafluoroethylene. It will be understood that the diameter of the conductor will determine to a large extent the preferred thickness of the insulation. The following ranges were established with a #28 copper wire which had a diameter of .0126 inch. For certain applications, where abrasion resistance is not important, polytetrafluoroethylene films or sheaths having a thickness of .0003 inch are useful for electrical insulations. Films or sheaths less than .0003 inch are too thin to be of practical value. Films or sheaths having a thickness greater than .0025 inch are useful, but generally there is not obtained sufficient advantage from the greater thickness to justify the additional cost.

The adhesion of the polymeric material to the ceramic coating is sufficiently great that, in the above tests, the failure is at the interface between the ceramic coating and the wire rather than at the interface between the polymeric material and the ceramic coating.

It is sometimes desirable to add hydrous oxides to the first coat of the polymeric material coating composition applied over the ceramic coating to obtain an economic advantage. These hydrous oxides have water of hydration associated with them and are hydrated oxides of an element selected from groups III and IV of the periodic table, such as hydrated aluminum oxide, hydrated silicon dioxide, hydrated titanium dioxide, hydrated zirconium oxide. They are preferably used in an amount of 5% to 50% by weight based on the polymeric material. Such compositions are disclosed in copending application Serial No. 750,166, filed May 23, 1947, by C. K. Ikeda.

The solids content of the polymeric material coating composition may be varied over a wide range to decrease or increase the film build per coat, although the preferred range is 25% to 70% solids.

The application of a sheath or film of polymeric material over the ceramic wire insulation results in many outstanding advantages over all prior art insulation systems. The cut-through temperature for ceramic-polymeric material insulation is increased over that of the ceramic insulation used alone from approximately 247° C. to greater than 500° C. The abrasion resistance of the ceramic insulated wire is increased many fold by the application of the polymeric material coating. There is no loss of adhesion and discoloration when the insulation is heat aged at high temperatures (215° C.). This high heat resistance, coupled with retention of flexibility after being subjected to extremely high temperatures, has not heretofore been obtainable with ceramic coatings. This permits the production of insulated high temperature resistant conductors which can withstand very rough usage without failure of the electrical equipment in which they are used, as a result of fracturing or breaking of the insulation. The process of this invention also provides a method for the application of a finely adherent polymeric material sheath to a ceramic surface from a liquid coating composition.

The thinness of the insulation described above results in a tremendous savings in the size of electrical equipment for high temperature applications.

A further advantage is that the ceramic-polymeric material insulation is unaffected by corrosive liquids, such as strong organic and inorganic acids, as well as unaffected by oils, greases, and solvents at high temperatures. It is also resistant to oxidation, even in the presence of ozone.

A still further advantage is that the insulated wire can be elongated to about 30% (the breaking point of the copper wire) without fracturing the insulation. The ceramic undercoating will break up into small particles during such elongation but will remain embedded in the polymeric material. Never before has there been available a high temperature resistant insulation which would withstand such elongation.

The insulated wire produced in accordance with this invention is useful for a variety of purposes where high temperatures may be encountered, such as magnet coils, motors, generators, transformers, resistors, cables, heating coils, switchgear, and electric control equipment. Wires insulated with the ceramic-polymeric material system of this invention are particularly useful where long life and resistance to heat, oxidation, corrosive conditions, and lubricants are important.

It is apparent that many widely different embodiments of this invention can be made without departing from the spirit and scope thereof; and, therefore, it is not intended to be limited except as indicated in the appended claims.

I claim:

1. An electrical conductor provided with an insulating ceramic coating therearound and a superposed sheath coating of a polymeric material selected from the group consisting of polytetrafluoroethylene and copolymers of tetrafluoroethylene and another polymerizable organic compound containing an ethylenic double bond.

2. The insulated electrical conductor of claim 1 in which the polymeric material is polytetrafluoroethylene.

3. The insulated electrical conductor of claim 1 in which the sheath coating is at least .0003 inch thick.

4. An electrical conductor provided with an insulating ceramic coating therearound and a superposed sheath coating of a copolymer of tetrafluoroethylene and another polymerizable organic compound containing an ethylenic double bond.

5. The insulated electrical conductor of claim 4 in which the copolymer is the reaction product of 50%–85% tetrafluoroethylene and 50%–15% ethylene.

6. In the process of producing an insulated electrical conductor, the improvement which comprises coating a ceramic covered conductor with a coating composition comprising a suspensoid of a polymeric material selected from the group consisting of polytetrafluoroethylene and copolymers of tetrafluoroethylene and another polymerizable organic compound containing an ethylenic double bond, said copolymers being dispersed in an organic medium, heating to adhere the coating particles to the ceramic coating and to themselves, and cooling to room temperature.

7. The process of claim 6 in which the coating, after coalescing, is at least .0003 inch thick.

8. The process of claim 6 in which the polymeric material is polytetrafluoroethylene.

9. In the process of producing an insulated electrical conductor, the improvement which comprises coating a ceramic covered conductor with an aqueous suspension of polytetrafluoroethylene, heating to adhere the polytetrafluoroethylene particles to the ceramic coating and to themselves, and cooling to room temperature.

10. The process of claim 9 in which the coating is heated at a temperature of at least 621° F.

11. The process of claim 9 in which the aqueous suspension has a solids content of 25% to 70%.

12. In the process of producing an insulated electrical conductor, the improvement which comprises coating a ceramic covered conductor with a suspensoid of a copolymer of tetrafluoroethylene and another polymerizable organic compound containing an ethylenic double bond, said copolymer being dispersed in an organic medium, heating to adhere the copolymer particles to the ceramic coating and to themselves, and cooling to room temperature.

13. The process of claim 12 in which the copolymer consists essentially of the reaction product of 50%–85% tetrafluoroethylene and 50%–15% ethylene.

14. In the process of producing an insulated electrical conductor, the improvement which comprises coating a ceramic covered conductor with an aqueous suspension of polytetrafluoroethylene containing a hydrated oxide of an element selected from groups III and IV of the periodic table, heating to adhere the polytetrafluoroethylene particles to the ceramic coating and to themselves, and cooling to room temperature.

15. In the process of producing an insulated electrical conductor, the improvement which comprises coating an electrical conductor with an aqueous suspension mixture of a ceramic material and polytetrafluoroethylene, heating to coalesce the suspension particles, cooling, applying thereover a coating composition comprising a suspensoid of a polymeric material selected from the group consisting of polytetrafluoroethylene and copolymers of tetrafluoroethylene and another polymerizable organic compound containing an ethylenic double bond, said copolymers being dispersed in an organic medium, heating to adhere the coating particles to the first coating and to themselves, and cooling to room temperature.

PHILIP FRANCIS SANDERS.

REFERENCES CITED

The following references are of record in the file of this patent:

UNITED STATES PATENTS

| Number | Name | Date |
|---|---|---|
| 2,392,388 | Joyce | Jan. 8, 1946 |
| 2,393,967 | Brubaker | Feb. 5, 1946 |
| 2,421,652 | Robinson et al. | June 3, 1947 |
| 2,448,952 | Berry | Sept. 7, 1948 |
| 2,468,664 | Hanford | Apr. 26, 1949 |
| 2,479,367 | Joyce | Aug. 16, 1949 |